US011354172B2

(12) United States Patent
Behl et al.

(10) Patent No.: US 11,354,172 B2
(45) Date of Patent: Jun. 7, 2022

(54) CENTRALIZED ACCESS CONTROL CIRCUIT FOR CONTROLLING ACCESS TO PERIPHERALS

(71) Applicant: NXP USA, Inc., Austin, TX (US)

(72) Inventors: Ankur Behl, New Delhi (IN); Vikas Agarwal, Agra (IN)

(73) Assignee: NXP USA, INC., Austin, TX (US)

( * ) Notice: Subject to any disclaimer, the term of this patent is extended or adjusted under 35 U.S.C. 154(b) by 8 days.

(21) Appl. No.: 17/009,758

(22) Filed: Sep. 1, 2020

(65) Prior Publication Data

US 2022/0066839 A1    Mar. 3, 2022

(51) Int. Cl.
*G06F 9/52* (2006.01)
*G06F 9/50* (2006.01)
*G06F 13/40* (2006.01)
*G06F 9/30* (2018.01)

(52) U.S. Cl.
CPC ............ *G06F 9/52* (2013.01); *G06F 9/30098* (2013.01); *G06F 9/5038* (2013.01); *G06F 9/5061* (2013.01); *G06F 13/4004* (2013.01); *G06F 2213/0038* (2013.01)

(58) Field of Classification Search
CPC ...... G06F 9/52; G06F 9/30098; G06F 9/5038; G06F 9/5061; G06F 13/4004; G06F 13/364; G06F 13/362; G06F 13/1605; G06F 13/18; G06F 13/1663; G06F 2213/0038

See application file for complete search history.

(56) References Cited

U.S. PATENT DOCUMENTS

| | | | |
|---|---|---|---|
| 7,149,828 B2 * | 12/2006 | Hayashi | G06F 13/364 710/120 |
| 7,434,264 B2 | 10/2008 | Moyer et al. | |
| 7,571,270 B1 * | 8/2009 | Nemirovsky | G06F 9/524 710/200 |
| 9,344,296 B2 | 5/2016 | Gerlach et al. | |
| 9,501,332 B2 * | 11/2016 | Vantrease | G06F 9/52 |
| 9,678,897 B2 * | 6/2017 | Wang | G06F 16/1774 |
| 10,169,238 B2 * | 1/2019 | Katayama | G06F 12/1466 |
| 10,579,550 B2 * | 3/2020 | Katayama | G06F 13/1663 |
| 10,839,877 B1 * | 11/2020 | Barman | G11C 7/24 |
| 2018/0314463 A1 * | 11/2018 | Katayama | G06F 13/1642 |

FOREIGN PATENT DOCUMENTS

GN    105138929 A    12/2015

\* cited by examiner

*Primary Examiner* — Brian T Misiura

(57) ABSTRACT

A centralized access control circuit includes a memory, a sub-circuit, and a memory controller. The memory includes a plurality of lock bits mapped to a plurality of bytes of a peripheral register included in a peripheral. The sub-circuit receives, from a processor core, an access request to access a set of bytes of the plurality of bytes. The sub-circuit grants a first level of access privilege to the processor core based on an identifier of the processor core and an address of the set of bytes included in the access request. The memory controller receives the access request and grants, based on a value of each of a set of lock bits mapped to the set of bytes, a second level of access privilege to the processor core. The processor core accesses the set of bytes based on the first and second levels of access privileges.

19 Claims, 4 Drawing Sheets

CENTRALIZED ACCESS CONTROL CIRCUIT FOR CONTROLLING ACCESS TO PERIPHERALS

BACKGROUND

The present disclosure relates generally to electronic circuits, and, more particularly, to a centralized access control circuit for controlling access by a processor core to peripherals on a system-on-chip (SoC).

Rising levels of system integration have resulted in an ever-increasing number of processor cores and peripherals being bundled on a single chip, i.e., an SoC. These processor cores execute various applications that require access (e.g., write-access) to the peripherals. In the interest of safety and security, it is often desirable to restrict access of unauthorized processor cores to a peripheral. Peripheral protection is typically implemented using a two-level hierarchy. In the two-level hierarchy, a first level of peripheral protection is implemented by way of a peripheral bridge that connects the processor cores with the peripherals and a second level of peripheral protection is implemented by way of a hardware security unit installed proximate to each peripheral that is to be protected. To write to a peripheral register of a peripheral that is protected, a processor core initiates a write request. The write request is typically indicative of an identifier of the processor core and a portion or a segment of the peripheral register that is to be accessed by the processor core. Based on the identifier, the peripheral bridge may grant or deny the write request. If the write request is granted, the write request is communicated to the hardware security unit of the peripheral register. The hardware security unit may include lock bits each realized by way of a flip-flop and mapped to a specific segment or a portion of the peripheral register. Based on values of lock bits mapped to the portion or segment to be accessed by the processor core, the hardware security unit may grant or deny the write request, thereby allowing or preventing the write operation on the corresponding portion or segment of the peripheral register.

A modern SoC typically includes various peripherals that are distributed across the SoC, necessitating installation of hardware security units in a distributed fashion. A distributed architecture of the hardware security units warrants an undesirable increase in an area of the SoC leading to increased fabrication costs, higher power consumption, and higher latency for read and write operations. Protection of a peripheral, a peripheral register, or a specific set of bytes (i.e., portion or segment) of the peripheral register requires installation of a corresponding hardware security unit. Therefore, peripherals or peripheral registers that require protection are to be finalized during a design phase of the SoC and prior to fabrication of the SoC, resulting in poor scalability. For example, an SoC that includes first and second peripherals may be fabricated based on a design that includes a hardware security unit only for the first peripheral. In such a scenario, peripheral security cannot be implemented for the second peripheral even if a need for protecting the second peripheral arises.

In light of aforementioned drawbacks, it would be advantageous to have a technical solution for protection of peripherals on an SoC, meeting requirements of scalability and optimizing an area of the SoC.

SUMMARY

In one embodiment, a centralized access control circuit to control access privileges of a set of processor cores for accessing at least one peripheral is disclosed. The peripheral includes at least one peripheral register. The centralized access control circuit includes a memory that includes a plurality of lock bits mapped to a plurality of bytes of the peripheral register, respectively. The centralized access control circuit further includes a first sub-circuit that is configured to receive, from a first processor core of the set of processor cores, a first access request to access a set of bytes of the plurality of bytes. The first access request includes a first identifier of the first processor core and a first address of the set of bytes. The first sub-circuit is further configured to grant, based on the first identifier and the first address, a first level of access privilege to the first processor core for accessing the peripheral. The centralized access control circuit further includes a memory controller that is coupled to the memory and the first sub-circuit. The memory controller is configured to receive the first access request and grant, based on a value of each of a set of lock bits mapped to the set of bytes, a second level of access privilege to the first processor core for accessing the set of bytes. The plurality of lock bits include the set of lock bits. The set of bytes is accessed by the first processor core based on the first and second levels of access privileges.

In another embodiment, a system-on-chip (SoC) is disclosed. The SoC includes a set of processor cores including a first processor core, at least one peripheral comprising at least one peripheral register, and a centralized access control circuit. The peripheral register includes a plurality of bytes. The centralized access control circuit is coupled to the set of processor cores and the peripheral to control access privileges of the set of processor cores for accessing the peripheral. The centralized access control circuit includes a memory that includes a plurality of lock bits mapped to the plurality of bytes, respectively. The centralized access control circuit further includes a first sub-circuit. The first sub-circuit is configured to receive, from the first processor core, a first access request to access a set of bytes of the plurality of bytes. The first access request includes a first identifier of the first processor core and a first address of the set of bytes. The first sub-circuit is further configured to grant, based on the first identifier and the first address, a first level of access privilege to the first processor core, for accessing the peripheral. The centralized access control circuit further includes a memory controller that is coupled to the memory and the first sub-circuit. The memory controller is configured to receive the first access request. The memory controller is further configured to grant, based on a value of each of a set of lock bits mapped to the set of bytes, a second level of access privilege to the first processor core for accessing the set of bytes. The plurality of lock bits include the set of lock bits. The set of bytes is accessed by the first processor core based on the first and second levels of access privileges.

In another embodiment, a method for controlling access privileges of a processor core for accessing at least one peripheral is provided. The peripheral includes at least one peripheral register having a plurality of bytes. The method includes storing, by a centralized access control circuit, a plurality of lock bits mapped to the plurality of bytes, respectively. The method further includes receiving, by the centralized access control circuit from the processor core, an access request to access a set of bytes of the plurality of bytes. The access request includes an identifier of the processor core and an address of the set of bytes. The method further includes granting, by the centralized access control circuit, based on the identifier and the address, a first level of access privilege to the processor core for accessing the peripheral. The method further includes granting, by the centralized access control circuit, based on a set of lock bits mapped to the set of bytes, a second level of access privilege to the processor core for accessing the set of bytes. The plurality of lock bits include the set of lock bits. The set of bytes is accessed by the processor core based on the first and second levels of access privileges.

In some embodiments, the first sub-circuit is further configured to store a set of rules associated with the first level of access privilege. The first sub-circuit grants the first level of access privilege to the first processor core further based on the set of rules.

In some embodiments, the centralized access control circuit further includes a second sub-circuit that is coupled to the memory controller, and is configured to store a plurality of initial values of the plurality of lock bits, respectively. The memory controller is further configured to initialize the plurality of lock bits based on the plurality of initial values upon reset of the centralized access control circuit.

In some embodiments, the first access request corresponds to a write operation to be performed by the first processor core on the set of bytes of the peripheral register. The first access request further includes control data to control simultaneous execution of the write operation on the set of bytes by the first processor core and a lock operation on the set of lock bits.

In some embodiments, when the control data has a first control value, the memory controller is further configured to execute the lock operation on the set of lock bits in parallel to execution of the write operation on the set of bytes by the first processor core. In the lock operation, the value of each of the set of lock bits is updated to lock the set of bytes of the peripheral register for a subsequent write operation.

In some embodiments, the first sub-circuit is further configured to receive, from a second processor core of the set of processor cores, a second access request to access the set of bytes. The second access request includes a second identifier of the second processor core and the first address of the set of bytes. The first sub-circuit is further configured to grant, based on the second identifier and the first address, the first level of access privilege to the second processor core for accessing the peripheral. The memory controller is further configured to deny, based on the updated value of each of the set of lock bits, the second level of access privilege to the second processor core for accessing the set of bytes. The memory controller is further configured to generate an error event to indicate that the second level of access privilege is denied to the second processor core. The first sub-circuit is further configured to terminate the second access request based on the error event.

In some embodiments, when the control data has a second control value, the memory controller is further configured to receive a lock request from the first processor core to execute the lock operation on the set of lock bits subsequent to execution of the write operation. The lock request includes a second address of the set of lock bits and first data that is to be written to the set of lock bits. The memory controller is further configured to execute the lock operation on the set of lock bits based on the lock request. In the lock operation, the first data is written to the set of lock bits to update the value of each of the set of lock bits.

In some embodiments, the centralized access control circuit further includes a comparator that is coupled to the memory controller, and is configured to receive the first access request. The comparator is further configured to provide the first access request and one of a first instruction and a second instruction to the memory controller based on the control data included in the first access request. The simultaneous execution of the write operation on the set of bytes by the first processor core and the lock operation on the set of lock bits is controlled based on one of the first instruction and the second instruction.

In some embodiments, the memory controller is further configured to determine, based on the received lock request, an eligibility of the first processor core for a third level of access privilege. The memory controller is further configured to grant a third level of access privilege to the first processor core based on the determined eligibility. The lock operation is executed on the set of lock bits based on the third level of access privilege granted to the first processor core.

Various embodiments of the present disclosure present a centralized access control circuit to control access privileges of a set of processor cores for accessing a peripheral. The peripheral includes at least one peripheral register. The centralized access control circuit, the set of processor cores, and the peripheral are included in a system-on-chip (SoC). The centralized access control circuit includes a memory that includes a plurality of lock bits mapped to a plurality of bytes of the peripheral register, respectively. The centralized access control circuit further includes a first sub-circuit that is configured to receive, from a first processor core of the set of processor cores, a first access request to access a set of bytes of the plurality of bytes. The first access request includes a first identifier of the first processor core and a first address of the set of bytes. The first sub-circuit is further configured to grant, based on the first identifier and the first address, a first level of access privilege to the first processor core for accessing the peripheral. The centralized access control circuit further includes a memory controller that is coupled to the memory and the first sub-circuit. The memory controller is configured to receive the first access request and grant, based on a value of each of a set of lock bits mapped to the set of bytes, a second level of access privilege to the first processor core for accessing the set of bytes. The plurality of lock bits include the set of lock bits. The set of bytes is accessed by the first processor core based on the first and second levels of access privileges. Based on the first access request, the set of lock bits may be updated in parallel to the accessing of the set of bytes by the first processor core to restrict subsequent access to the set of bytes by any other processor core.

Thus, the centralized access control circuit of the present disclosure provides security for the peripheral by controlling access privileges of the set of processor cores for accessing the peripheral. The centralized access control circuit integrates peripheral level protection and peripheral register level protection for the peripheral and the peripheral register on the SoC within a single hardware circuit. This results in a smaller area for the SoC, in contrast to conventional methods of implementing peripheral protection. Reducing the area of the SoC results in various benefits such as, but not limited to, lower cost of fabrication, lower power consumption, and decreased latency for communication between components of the SoC. Further, protection for each peripheral register may be configured through software (i.e., by changing values of corresponding lock bits). This enables the SoC to meet varied protection requirements across multiple application areas. This allows the design of the SoC to be modular, rendering the SoC scalable to achieve different degrees of protection for various applications.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
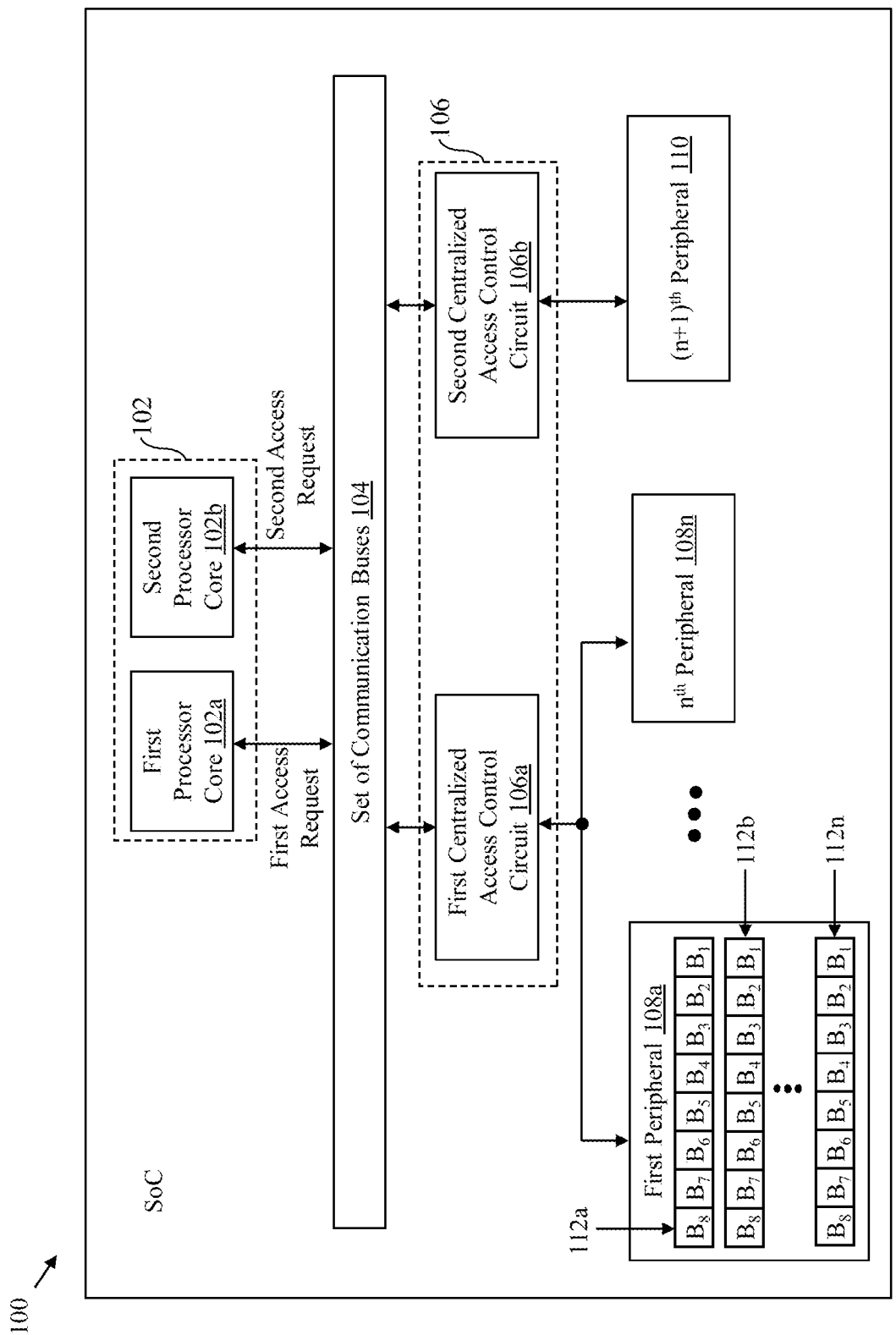
FIG. 1 illustrates a schematic block diagram of a system-on-chip (SoC) in accordance with an embodiment of the present disclosure.

FIG. 1 illustrates a schematic block diagram of a system-on-chip (SoC) 100 in accordance with an embodiment of the present disclosure. The SoC 100 includes a set of processor cores 102 of which first and second processor cores 102a and 102b are shown. The SoC 100 further includes a set of communication buses 104, a set of centralized access control circuits 106 of which first and second centralized access control circuits 106a and 106b are shown. The SoC 100 further includes first through $n^{th}$ peripherals 108a-108n associated with the first centralized access control circuit 106a and an $(n+1)^{th}$ peripheral 110 associated with the second centralized access control circuit 106b. The first peripheral 108a includes first through $n^{th}$ peripheral registers 112a-112n. The SoC 100 may be included in various devices such as automotive devices, consumer electronics devices such as mobile devices, network devices, or the like. It will be understood by those of ordinary skill in the art that the SoC 100 includes various other circuits and systems (e.g., a system memory, or the like) for its operation, which are not shown in order not to obscure the disclosure. Hereinafter, the first through $n^{th}$ peripherals 108a-108n are collectively referred to as "a plurality of peripherals 108a-108n" and the first through $n^{th}$ peripheral registers 112a-112n are collectively referred to as "a plurality of peripheral registers 112a-112n".

The set of processor cores 102 is coupled to the set of communication buses 104 and is configured to execute (or run) various applications. For example, when the SoC 100 is embedded within an automotive system, the applications may include an anti-lock braking application, an airbag control application, an adaptive cruise control application, or the like. In one embodiment, the first and second processor cores 102a and 102b are each configured to execute multiple applications, concurrently. In another embodiment, one application is executed on multiple processor cores (e.g., the first and second processor cores 102a and 102b). The set of processor cores 102 may be implemented by way of central processing units, processors, microprocessors, electronic control units, microcontroller units, and the like. The set of processor cores 102 may include any number of processor cores; however, for the sake of brevity, the set of processor cores 102 is assumed to include two processor cores (i.e., the first and second processor cores 102a and 102b).

The first and second processor cores 102a and 102b are associated with unique first and second identifiers, respectively, e.g., first and second domain identifiers. The first and second processor cores 102a and 102b are configured to generate and communicate access requests to the first and second centralized access control circuits 106a and 106b for accessing the plurality of peripherals 108a-108n or the $(n+1)^{th}$ peripheral 110. Each access request is one of a read request or a write request, i.e., each access request corresponds to a read operation or a write operation to be executed on a peripheral register included in a peripheral (e.g., the plurality of peripherals 108a-108n or the $(n+1)^{th}$ peripheral 110). Each access request includes an identifier (e.g., a domain identifier or an application-specific integrated circuit level identifier) of the corresponding processor core and an address of a set of bytes of a peripheral register that are to be accessed. In a scenario where an access request is a write request, the access request further includes data that is to be written to the accessed set of bytes.

In one example, a first access request is generated and communicated by the first processor core 102a to the first centralized access control circuit 106a for executing a write operation on a first set of bytes (e.g., bytes $B_1$ and $B_2$) of the first peripheral register 112a. The first access request includes the first identifier of the first processor core 102a and a first address of the first set of bytes (i.e., the bytes $B_1$ and $B_2$) of the first peripheral register 112a. The first access request further includes first data to be written to the first set of bytes (i.e., the bytes $B_1$ and $B_2$) of the first peripheral register 112a. Similarly, a second access request is generated and communicated by the second processor core 102b to the first centralized access control circuit 106a to execute a write operation on the first set of bytes (e.g., the bytes $B_1$ and $B_2$) of the first peripheral register 112a. The second access request includes the second identifier of the second processor core 102b and the first address of the first set of bytes (i.e., the bytes $B_1$ and $B_2$) of the first peripheral register 112a. The second access request further includes second data to be written to the first set of bytes (i.e., the bytes $B_1$ and $B_2$) of the first peripheral register 112a.

The first and second processor cores 102a and 102b are further configured to generate and communicate lock requests and/or unlock requests to the set of centralized access control circuits 106. Lock requests and unlock requests are explained in detail in conjunction with FIG. 2.

The set of communication buses 104 is configured to facilitate communication between the set of processor cores 102, the set of centralized access control circuits 106, the plurality of peripherals 108a-108n, the $(n+1)^{th}$ peripheral 110, and any other component on the SoC 100. For example, the set of communication buses 104 receives access requests (e.g., the first and second access requests) from the set of processor cores 102 and communicates each access request to the first or second centralized access control circuit 106a or 106b. The set of communication buses 104 may include a set of system buses, a set of peripheral buses, a set of address buses, a set of data buses, a set of control buses, a set of user buses, or a combination thereof. The set of communication buses 104 may be compliant with various bus protocols. The bus protocols may include, but not limited to, an advanced microcontroller bus architecture (AMBA) protocol, an advanced high performance (AHB)

bus protocol, or the like. The bus protocols may further include an advanced system bus (ASB) protocol, an advanced peripheral bus (APB) protocol, an advanced extensible interface (AXI) protocol, or the like.

The first and second centralized access control circuits 106a and 106b are coupled to the set of processor cores 102 via the set of communication buses 104. The first and second centralized access control circuits 106a and 106b include suitable logic, circuitry, interfaces, and/or code, executable by the circuitry, that is configured to restrict access of the set of processor cores 102 to the plurality of peripherals 108a-108n and the $(n+1)^{th}$ peripheral 110, respectively. For example, the first centralized access control circuit 106a controls read-access or write-access of the set of processor cores 102 to the plurality of peripherals 108a-108n. The first centralized access control circuit 106a is configured to allow or deny execution of a read operation or a write operation on a peripheral register of the plurality of peripherals 108a-108n or a segment of the peripheral register, based on a corresponding received access request and a stored set of rules. Similarly, the second centralized access control circuit 106b controls read-access or write-access of the set of processor cores 102 to the $(n+1)^{th}$ peripheral 110. Operations of the first and second centralized access control circuits 106a and 106b are explained in detail in conjunction with FIG. 2.

The plurality of peripherals 108a-108n and the $(n+1)^{th}$ peripheral 110 are coupled to the first and second centralized access control circuits 106a and 106b, respectively, and include resources that are required for execution of the applications by the set of processor cores 102. Examples of the plurality of peripherals 108a-108n and the $(n+1)^{th}$ peripheral 110 may include, but are not limited to, timers, analog-to-digital converters (ADCs), digital-to-analog converters (DACs), or the like. Examples of the plurality of peripherals 108a-108n and the $(n+1)^{th}$ peripheral 110 may further include direct memory access (DMA) controllers, pulse width modulation (PWM) controllers, interrupt controllers, watchdog timers, or the like. Examples of the plurality of peripherals 108a-108n and the $(n+1)^{th}$ peripheral 110 may further include universal synchronous/asynchronous receiver/transmitter (UART) controllers, serial peripheral interface (SPI) controllers, inter-integrated circuit (I2C) controllers, or the like. Each of the plurality of peripherals 108a-108n and the $(n+1)^{th}$ peripheral 110 includes one or more peripheral registers for controlling an operation or a function of a corresponding peripheral. For example, the first peripheral 108a includes the plurality of peripheral registers 112a-112n. For the sake of brevity, only the plurality of peripheral registers 112a-112n of the first peripheral 108a are shown in FIG. 1, and it is assumed that the second through $n^{th}$ peripherals 108b-108n and the $(n+1)^{th}$ peripheral 110 are similar to the first peripheral 108a and include various peripheral registers.

The plurality of peripheral registers 112a-112n enable the set of processor cores 102 to control a functioning or an operation of the first peripheral 108a. In a non-limiting example, the first peripheral 108a may be a timer unit 108a. The first peripheral register 112a may be a register for configuring the timer unit 108a as a timer or a counter. The second peripheral register 112b may be a register for loading a timer value to the timer unit 108a. The $n^{th}$ register 112n may be a register for configuring a pre-scaler of the timer unit 108a. For the sake of brevity, each peripheral register of the plurality of peripheral register 112a-112n is shown to be an 8-byte (i.e., including first through eighth bytes $B_1$-$B_8$) or 64-bit register. However, it will be apparent to those of skill in the art that each peripheral register of the plurality of peripheral register 112a-112n may include any number of bytes without deviating from the scope of the disclosure. In another embodiment, each peripheral register of the plurality of peripheral register 112a-112n may be a 2-byte register, a 4-byte register, or the like.

Figure 2:
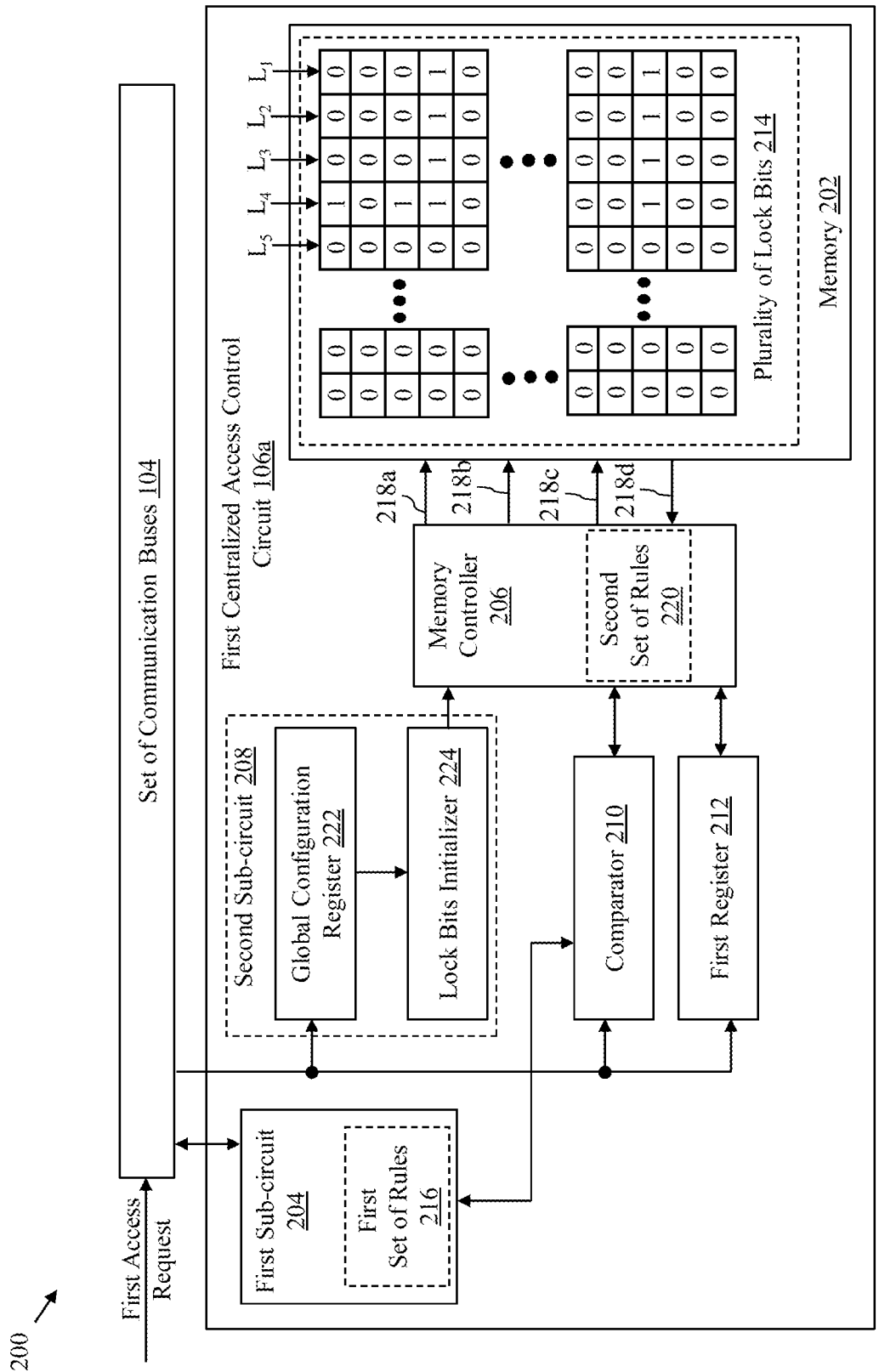
FIG. 2 illustrates a schematic block diagram of a centralized access control circuit of the SoC in accordance with an embodiment of the present disclosure.

FIG. 2 illustrates a schematic block diagram 200 of the first centralized access control circuit 106a in accordance with an embodiment of the present disclosure. FIG. 2 is explained in conjunction with FIG. 1. The first centralized access control circuit 106a includes a memory 202, a first sub-circuit 204, a memory controller 206, and a second sub-circuit 208. The first centralized access control circuit 106a further includes a comparator 210 and a first register 212. Internal components of the first centralized access control circuit 106a (e.g., the memory 202, the first sub-circuit 204, or the like) may communicate with one another using the set of communication buses 104, a set of internal communication buses, or a combination thereof. It will be understood by those of ordinary skilled in the art that the second centralized access control circuit 106b is structurally and functionally similar to the first centralized access control circuit 106a, without deviating from the scope of the disclosure. For the sake of brevity, it is assumed that the plurality of peripherals 108a-108n are under peripheral protection.

The memory 202 is coupled to the memory controller 206 and includes a plurality of lock bits 214. The plurality of lock bits 214 are mapped to a plurality of bytes of the peripheral registers included in the plurality of peripherals 108a-108n. For example, first through fifth locks bits $L_1$-$L_5$ of the plurality of lock bits 214 are mapped to the first through fifth bytes $B_1$-$B_5$ of the first peripheral register 112a, respectively. Sixth through eighth lock bits (not labelled) of the plurality of lock bits 214 are mapped to the sixth through eighth bytes $B_6$-$B_8$ of the first peripheral register 112a. Similarly, ninth through sixteenth lock bits (not labelled) of the plurality of lock bits 214 are mapped to first through eighth bytes $B_1$-$B_8$ of the second peripheral register 112b.

In the current embodiment, each of the plurality of lock bits 214 is mapped to a single byte of a peripheral register. However, in another embodiment, each lock bit of the plurality of lock bits 214 may be mapped to two or more contiguous bytes of a peripheral register without deviating from the scope of the disclosure.

A value of a lock bit (e.g., any of the plurality of lock bits 214) indicates a lock status of a corresponding mapped byte, i.e., whether the corresponding byte mapped to the lock bit is locked for write operations. In other words, the value of the lock bit indicates whether execution of a write operation on the corresponding mapped byte is restricted (i.e., permitted or not). In one embodiment, when a value of a lock bit (e.g., the fourth lock bit $L_4$) equals "1", no write operation is allowed to be executed on the corresponding mapped byte (i.e., no data may be written to the corresponding mapped byte). In other words, the value "1" of the lock bit indicates that that the corresponding mapped byte is locked (i.e., lock status). When a value of a lock bit equals "0", a write operation may be executed on the corresponding mapped byte (i.e., data may be written to the corresponding mapped byte) by a processor core with requisite privileges. In other words, the value "0" of the lock bit indicates that the corresponding mapped byte is not locked (i.e., lock status). As shown in FIG. 2, the value of each of the first through third lock bits $L_1$-$L_3$ equals "0". Thus, data may be written to the first through third bytes $B_1$-$B_3$ of the first peripheral register 112a by the first processor core 102a or the second processor core 102b with requisite privileges. Similarly, the value of the fourth lock bit $L_4$ is "1". Thus, the fourth byte $B_4$ of the first peripheral register 112a is protected against write-access. This implies that data may not be written onto the fourth byte $B_4$ of the first peripheral register 112a by any of the first and second processor cores 102a and 102b until the value of the fourth lock bit $L_4$ is updated to "0".

In an alternate embodiment, when a value of the lock bit equals "0", the corresponding mapped byte may be rendered locked for write operations, and the corresponding mapped byte may not be locked when the value of the lock bit equals "1".

In a non-limiting example, the memory 202 may be error-correcting code (ECC) protected, thereby ensuring that a value of each of the plurality of lock bits 214 is protected against system errors or crashes. In another embodiment, a value of each of the plurality of lock bits 214 may be retained upon reset of the SoC 100 or the first centralized access control circuit 106a.

The first sub-circuit 204 is coupled to the set of communication buses 104 and includes suitable logic, circuitry, interfaces, and/or code, executable by the circuitry, that is configured to control a first level of access privilege of the set of processor cores 102 for accessing the plurality of peripherals 108a-108n. The first sub-circuit 204 stores therein a first set of rules 216 associated with the first level of access privilege. The first set of rules 216 may be implemented in the form of a look-up-table (LUT), and may indicate access privileges of each of the set of processor cores 102 for accessing the plurality of peripherals 108a-108n. For example, a first rule of the first set of rules 216 may indicate that the first processor core 102a is allowed access (e.g., read-access or write-access) to only the first peripheral 108a from the plurality of peripherals 108a-108n. This implies that the first processor core 102a is allowed to read from or write to only the plurality of peripheral registers 112a-112n of the first peripheral 108a. A second rule of the first set of rules 216 may indicate that the second processor core 102b is allowed access (e.g., read-access and write-access) to each of the plurality of peripherals 108a-108n. This implies that the second processor core 102b is allowed to read from or write to any peripheral register (e.g., the plurality of peripheral registers 112a-112n) included in the plurality of peripherals 108a-108n.

It will be apparent to those of skill in the art that the first set of rules 216 may store various types of rules. For example, a rule may define, for each processor core, one or more peripherals of the plurality of peripherals 108a-108n that may be accessed by a corresponding processor core only for reading data (i.e., executing read operations). Another rule, may define, for each processor core, one or more peripherals of the plurality of peripherals 108a-108n that may be accessed by a corresponding processor core for writing data (i.e., executing write operations). Another rule may define, for each processor core, specific peripheral registers within each of the plurality of peripherals 108a-108n that may be accessed by a corresponding processor core for both reading and writing data.

The first sub-circuit 204 is configured to grant or deny the first level of access privilege to the first and second processor cores 102a and 102b for accessing a peripheral, based on a received access request and the first set of rules 216. For example, based on the first access request and the first set of rules 216, the first sub-circuit 204 may grant the first level of access privilege to the first processor core 102a for accessing the first peripheral 108a and/or the first peripheral register 112a. When the first level of access privilege is granted to the first processor core 102a, the first sub-circuit 204 communicates the first access request to the comparator 210 that is coupled to the first sub-circuit 204 and the memory controller 206.

The comparator 210 is configured to receive, from the first sub-circuit 204, access requests for which the first level of access privilege is granted. For example, the comparator 210 receives the first access request from the first sub-circuit 204, based on the granting of the first access level of access privilege to the first processor core 102a. The comparator 210 is further configured to communicate the received access requests (e.g., the first access request) to the memory controller 206.

In one embodiment, each access request communicated by the first or second processor core 102a or 102b may further include control data to control simultaneous or parallel execution of a write operation on a set of bytes of a peripheral register and a lock operation on a corresponding set of lock bits. For example, the first access request further includes first control data to control simultaneous execution of a write operation on the first set of bytes of the first peripheral register 112a by the first processor core 102a and a lock operation on a first set of lock bits mapped to the first set of bytes by the memory controller 206. Executing a lock operation on any of the plurality of lock bits 214 entails updating a value of the corresponding lock bit to "I". The comparator 210 is further configured to compare the first control data with first and second control values stored therein. The first control value is indicative of simultaneous execution of a write operation and a lock operation, and the second control value is indicative of execution of the write operation without the lock operation. When the first control data has the first control value (e.g., "00"), the comparator 210 communicates a first instruction to the memory controller 206, in addition to the first access request. When the first control data has the second control value (e.g., "11"), the comparator 210 communicates a second instruction to the memory controller 206, in addition to the first access request.

The memory controller 206 is coupled to the first sub-circuit 204 by way of the comparator 210. The memory controller 206 is further coupled to the memory 202 by way of a chip-select line 218a, a read-write select line 218b, a write-data line 218c, and a read-data line 218d. The chip-select line 218a enables the memory controller 206 to select the memory 202 for access. The read-write select line 218b enables the memory controller 206 to select whether data is to be written to or read from the memory 202. The write-data line 218c is a data line that allows the memory controller 206 to write data to the memory 202 (e.g., update or modify a value of any of the plurality of lock bits 214). The read-data line 218d is a data line that allows the memory controller 206 to read data from the memory 202 (e.g., read a value of a lock bit). Hereinafter, the chip-select line 218a, the read-write select line 218b, the write-data line 218c, and the read-data line 218d are collectively designated and referred to as "the set of lines 218".

The memory controller 206 is configured to receive, from the comparator 210, access requests and corresponding instructions (e.g., the first or second instruction). The memory controller 206 is further configured to control a second level of access privilege of the set of processor cores 102 for accessing the peripheral registers of the plurality of peripherals 108a-108n. The memory controller 206 is configured to grant or deny the second level of access privilege to each of the set of processor cores 102 for accessing a peripheral register of the plurality of peripherals 108a-108n or a segment or a portion of the peripheral register, based on a value of each of mapped one or more lock bits of the plurality of lock bits 214.

In one embodiment, when the memory controller 206 receives the first instruction along with an access request from the comparator 210, the memory controller 206 is further configured to execute a lock operation on one or more lock bits of the plurality of lock bits 214 that correspond to the access request. In other words, no separate request has to be communicated to the memory controller 206 for executing the lock operation. To execute the lock operation on a lock bit of the plurality of lock bits 214, the memory controller 206 updates a value of the lock bit from "0" to "1". When the value of the lock bit is set to "1", a corresponding mapped byte of a peripheral register gets locked for any subsequent write operation attempted by any of the first or second processor core 102a or 102b.

In another embodiment, when the memory controller 206 receives the second instruction along with the access request from the comparator 210, the memory controller 206 is configured to not execute the lock operation on the one or more lock bits of the plurality of lock bits 214 that correspond to the access request even if the second level of access privilege is granted based to the access request. In other words, the memory controller 206 does not execute the lock operation when the second instruction is received from the comparator 210.

Thus, the simultaneous execution of the write operation by the first or second processor core 102a or 102b and the lock operation on the one or more lock bits of the plurality of lock bits 214 is controlled based on the reception of one of the first instruction and the second instruction by the memory controller 206 from the comparator 210.

In one embodiment, the memory controller 206 is further configured to receive lock requests or unlock requests from the set of processor cores 102 for updating values of one or more lock bits of the plurality of lock bits 214. The received lock or unlock requests may be standalone requests or may be generated and communicated by the set of processor cores 102 following the communication of access requests. In some embodiments, based on certain requirements, a processor core of the set of processor cores 102 may set control data of a corresponding access request to the first control value to disable simultaneous (or parallel) execution of a write operation and locking of a corresponding set of bytes of a peripheral register. However, following the execution of the write operation, the processor core may intend to lock the corresponding set of bytes for subsequent access.

For example, the memory controller 206 may receive a first lock request from the first processor core 102a for executing the lock operation on the first set of lock bits (i.e., the first and second lock bits $L_1$ and $L_2$) to prevent other processor cores from writing to the first set of bytes (i.e., the first and second lock bytes $B_1$ and $B_2$ of the first peripheral register 112a) mapped to the first set of lock bits.

In some embodiments, the first or second processor core 102a or 102b may be granted the first level of access privilege and denied the second level of access privilege for accessing a set of bytes of a peripheral register, based on a value of each of one or more lock bits of the plurality of lock bits 214 mapped to the set of bytes. In such scenarios, the first or second processor core 102a or 102b may communicate an unlock request to the first centralized access control circuit 106a for updating a value of each of the one or more lock bits for gaining the second level of access privilege to write to the set of bytes. For example, the memory controller 206 may receive a first unlock request from the second processor core 102b for executing an unlock operation on the first set of lock bits (i.e., update or modify a value of the first set of lock bits from "1" to "0").

In some embodiments, the first or second processor core 102a or 102b may communicate a lock bit-read request for executing a lock bit-read operation for reading a current value of one or more lock bits of the plurality of lock bits 214.

Each lock request, unlock request, or lock bit-read request may include an identifier (e.g., the first or second identifier) of the corresponding processor core 102a or 102b that generated the lock request, unlock request, or lock bit-read request, and an address of a set of lock bits of the plurality of lock bits 214 that is to be updated or read. Each lock request or unlock request may further include a set of values to be written (i.e., updated) to the set of lock bits.

The first register 212 is a register that is coupled to the memory controller 206 and the set of communication buses 104, and is configured to receive the lock requests, the unlock requests, and the lock bit-read requests communicated by the set of processor cores 102. The first register 212 is further configured to store therein the received lock requests, the unlock requests, and the lock bit-read requests. For each lock or unlock request, the first register 212 is further configured to store therein a set of values to be written to the set of lock bits. For each lock bit-read request, the first register 212 is further configured to store therein a set of values read from the set of lock bits by the memory controller 206.

The first register 212 is further configured to provide each received lock request, unlock request, and lock bit-read request to the memory controller 206 for execution of a corresponding lock operation, a corresponding unlock operation, or a corresponding lock bit-read operation. In other words, each lock request, unlock request, or lock bit-read request is communicated by the set of processor cores 102 to the memory controller 206 by way of the first register 212.

Execution of the corresponding lock operation, the corresponding unlock operation, or the corresponding lock bit-read operation by the memory controller 206 is subject to a granting of a third level of access privilege to a corresponding processor core (e.g., the first processor core 102a or the second processor core 102b). The memory controller 206 is configured to store therein, a second set of rules 220 for granting the third level of access privilege. The second set of rules 220 includes one or more rules that determine whether a processor core of the set of processor cores 102 is allowed to read or update a value of any lock bit of the plurality of lock bits 214. For example, the second set of rules 220 includes one or more rules that indicate, for each lock bit of the plurality of lock bits 214, an identifier of each processor core that is allowed to update a value of a corresponding lock bit. In another example, the second set of rules 220 includes one or more rules that indicate, for each lock bit of the plurality of lock bits 214, an identifier of each processor core that is allowed to read a value of a corresponding lock bit. If the third level of access privilege is granted to the processor core, a corresponding lock operation, unlock operation, or lock bit-read operation is executed on the set of lock bits. Execution of a lock operation based on the granting of the third level of access privilege is explained in conjunction with FIG. 4.

The second sub-circuit 208 is configured to store therein initial values for the plurality of lock bits 214. The second sub-circuit 208 includes a global configuration register 222 and a lock bits initializer 224. The global configuration register 222 is coupled to the set of communication buses 104 and the lock bits initializer 224. Additionally, the lock bits initializer 224 is coupled to the memory controller 206. The lock bits initializer 224 includes a finite state machine (FSM) for determining a first plurality of initial values for the plurality of lock bits 214, upon reset of the SoC 100 or the first centralized access control circuit 106a. Upon the reset of the SoC 100 or the first centralized access control circuit 106a, the lock bits initializer 224 provides the first plurality of initial values to the memory controller 206. The memory controller 206 is configured to modify or update a value of each of the plurality of lock bits 214 based on the first plurality of initial values. In a non-limiting example, based on the first plurality of initial values, the memory controller 206 may set each lock bit of the plurality of lock bits 214 to "0". In other words, upon reset, each byte mapped to each lock bit of the plurality of lock bits 214 is not locked for access by the set of processor cores 102.

The global configuration register 222 is coupled to the lock bits initializer 224 and is configured to store a plurality of values (i.e., a first configuration) for the plurality of lock bits 214. The plurality of values may be indicative of one or more bytes, of the peripheral registers included in the plurality of peripherals 108a-108n, that are to be locked. In other words, the plurality of values may be indicative of one or more lock bits whose value is to be updated (e.g., value to be updated to "0" from "1") following initialization. The global configuration register 222 is configured to communicate the first configuration to the memory controller 206, by way of the lock bits initializer 224, for modifying the plurality of lock bits 214 based on the first configuration. The value of each of the one or more lock bits may be updated by the memory controller 206, based on the first configuration. For example, the value of the fourth lock bit $L_4$ of the plurality of lock bits 214 may be modified or updated from "0" to "1", based on the first configuration.

The global configuration register 222 is further configured to enable or disable simultaneous or parallel execution of lock operations and write operations (i.e., simultaneous execution based on control data included in an access request). The global configuration register 222 is further configured to store error events generated by the memory controller 206 in regards to granting the second level of access privilege and/or the third levels of access privilege to a processor core of the set of processor cores 102 by the memory controller 206.

In operation, upon resetting or powering up the SoC 100 or the first centralized access control circuit 106a, the lock bits initializer 224 provides the first plurality of initial values to the memory controller 206. The memory controller 206 updates the value of each of the plurality of lock bits 214 based on the first plurality of initial values. Following the initialization of the plurality of lock bits 214, the global configuration register 222 provides the first configuration to the memory controller 206 by way of the lock bits initializer 224. The memory controller 206 updates the plurality of lock bits 214 based on the first configuration. For example, the fourth lock bit $L_4$ is set to "1", locking the fourth byte $B_4$ of the first peripheral register 112a. In a non-limiting example, the global configuration register 222 has enabled simultaneous execution of lock operations and write operations.

The first processor core 102a communicates the first access request to the first centralized access control circuit 106a via the set of communication buses 104. The first access request includes the first identifier of the first processor core 102a, the first address of the bytes $B_1$ and $B_2$ (i.e., the first set of bytes) of the first peripheral register 112a, the first data to be written to the first set of bytes, and the first control data. Based on the first identifier, the first address of the first set of bytes, and the first data, the first sub-circuit 204 determines that the first processor core 102a is attempting to access the first peripheral register 112a of the first peripheral 108a for executing a write operation on the bytes $B_1$ and $B_2$ of the first peripheral register 112a.

Based on the first set of rules 216, the first sub-circuit 204 determines whether the first processor core 102a is allowed to access the first peripheral 108a (i.e., any of the plurality of peripheral registers 112a-112n) for executing write operations. In other words, the first sub-circuit 204 determines whether the first processor core 102a is to be granted the first level of access privilege for accessing the first peripheral 108a. In one embodiment, based on the first set of rules 216, the first sub-circuit 204 may determine that the first processor core 102a having the first identifier is not allowed to access the plurality of peripheral registers 112a-112n. Consequently, the first sub-circuit 204 may terminate the first access request and generate an error event to indicate that the first level of access privilege is denied to the first processor core 102a. Consequently, the first sub-circuit 204 may communicate a message to the first processor core 102a by way of the set of communication buses 104. The message is indicative of the generated error event.

However, in the current embodiment, it is assumed that the first sub-circuit 204 determines that the first processor core 102a having the first identifier is allowed to access the first peripheral 108a (i.e., allowed to access the first peripheral register 112a) associated with the first address. Consequently, the first sub-circuit 204 grants the first level of access privilege to the first processor core 102a. In other words, the first sub-circuit 204 grants the first level of access privilege to the first processor core 102a based on the first identifier, the first address of the bytes $B_1$ and $B_2$ (i.e., the first set of bytes), and the first set of rules. Following the granting of the first level of access privilege, the first sub-circuit 204 communicates the first access request to the comparator 210. The comparator 210 compares the first control data included in the first access request against the first and second control values. In a non-limiting example, the first control data corresponds to the first control value (i.e., "00"). Therefore, the comparator 210 communicates, to the memory controller 206, the first access request and the first instruction.

The memory controller 206 receives the first access request and the first instruction from the comparator 210. Based on the first address included in the first access request, the memory controller 206 identifies a set of lock bits that is mapped to the first set of bytes of the first peripheral register 112a that corresponds to the first address. For example, based on the first address, the memory controller 206 identifies that the first and second lock bits $L_1$ and $L_7$ are mapped to the bytes $B_1$ and $B_7$ of the first peripheral register 112a. Consequently, the memory controller 206 determines a value of each of the first and second lock bits $L_1$ and $L_2$. If a value of any of the first and second lock bits $L_1$ and $L_2$ is "1", the memory controller 206 denies the second level of access privilege to the first processor core 102a for writing to the first set of bytes (i.e., the bytes $B_1$ and $B_2$) of the first peripheral register 112a. In other words, if any byte of the first set of bytes mapped to the first and second lock bits $L_1$ and $L_2$ is protected against write-access, the memory controller 206 denies the second level of access privilege to the first processor core 102a.

Based on the denial of the second level of access privilege, the memory controller 206 generates an error event indicative of the denial and communicates a message indicative of the error event to the first sub-circuit 204. The error event may be stored in the global configuration register 222. The first sub-circuit 204 communicates the message to the first processor core 102a by way of the set of communication buses 104.

However, in the current embodiment, a value of each of the first and second lock bits $L_1$ and $L_2$ is currently "0", implying that the first set of bytes (i.e., the bytes $B_1$ and $B_2$ of the first peripheral register 112a) mapped to the first and second lock bits $L_1$ and $L_2$ is currently not locked. Therefore, based on the value of each of the first and second lock bits $L_1$ and $L_2$, the memory controller 206 grants the second level of access privilege to the first processor core 102a for writing to the first set of bytes of the first peripheral register 112a. The memory controller 206 communicates, to the first sub-circuit 204 by way of the comparator 210, a message indicative of the granting of the second level of access privilege. Based on the granted first and second levels of access privilege, the first sub-circuit 204 communicates the first access request to the first peripheral register 112a by way of the set of communication buses 104. Based on the first access request, the first data is written to the bytes $B_1$ and $B_2$ of the first peripheral register 112a. Parallelly, based on the first instruction, the memory controller 206 updates the value of each of the first and second lock bits $L_1$ and $L_2$ to "1" based on the granting of the second level of access privilege. The updated value (i.e., "1") of each lock bit of the first and second lock bits $L_1$ and $L_2$, indicates that the first set of bytes (i.e., the bytes $B_1$ and $B_2$ of the first peripheral register 112a) mapped to the first and second lock bits $L_1$ and $L_2$ is now locked for subsequent access. In other words, the first set of bytes is protected against any write operation subsequent to the write operation corresponding to the first access request (i.e., protected against subsequent write-access). In other words, no future write operation may be executed on any of the bytes $B_1$ and $B_2$ of the first peripheral register 112a.

In another embodiment, the first control data may have the second control value (i.e., "11"). Therefore, the comparator 210 communicates the first access request and the second instruction to the memory controller 206. Based on the second instruction, the value of each of the first and second lock bits $L_1$ and $L_2$ is not updated to "1". In other words, the memory controller 206 does not execute the lock operation on the first and second lock bits $L_1$ and $L_2$.

In some embodiments, the first processor core 102a may intend to lock the bytes $B_1$ and $B_2$ of the first peripheral register 112a after the execution of the write operation. Therefore, the first processor core 102a may generate and communicate the first lock request to the memory controller 206 for restricting any processor core from updating a value of any of the first set of bytes of the first peripheral register 112a. The first lock request is indicative of the first identifier of the first processor core 102a, the second address of the first and second lock bits $L_1$ and $L_2$, and third data to be written to the first and second lock bits $L_1$ and $L_2$. The first lock request indicates that the value of each of the first and second lock bits $L_1$ and $L_2$ is to be updated to "1".

The first lock request may be received by the first register 212 via the set of communication buses 104. The first register 212 stores therein, the first identifier, the second address, and the third data, and provides the first lock request to the memory controller 206. Based on the first identifier, the second address, and the third data (i.e., based on the first lock request), the memory controller 206 determines whether the first processor core 102a is allowed to update the value of each of the first and second lock bits $L_1$ and $L_2$. In other words, the memory controller 206 determines an eligibility of the first processor core 102a to update the value of each of the first and second lock bits $L_1$ and $L_2$. Based on the second set of rules 220, the memory controller 206 determines that the first processor core 102a is eligible to update the value of each of the first and second lock bits $L_1$ and $L_2$. Consequently, the memory controller 206 grants the third level of access privilege to the first processor core 102a. Based on the granted third level of access privilege, the memory controller 206 executes the lock operation to write the third data to the first and second lock bits $L_1$ and $L_2$.

In one embodiment, the second processor core 102b communicates the second access request to the first centralized access control circuit 106a. The second access request is a request for writing the second data to the first set of bytes (i.e., the bytes $B_1$ and $B_2$) of the first peripheral register 112a. The second access request includes the second identifier of the second processor core 102b, the first address of the first set of bytes, and the second data to be written to the first set of bytes. Based on the second identifier and the first address included in the second access request and the first set of rules 216, the second processor core 102b may be granted the first level of access privilege for accessing the first peripheral 108a. However, the memory controller 206 denies the second level of access privilege to the second processor core 102b for accessing the first set of bytes. The second level of access privilege is denied to the second processor core 102b since the value of each of the first and second lock bits $L_1$ and $L_2$ is equal to "1".

Based on the denial of the second level of access privilege to the second processor core 102b, the memory controller 206 generates an error event and communicates a message indicative of the error event to the first sub-circuit 204. The first sub-circuit 204 communicates the message to the second processor core 102b by way of the set of communication buses 104. In some embodiments, based on the message, the second processor core 102b may communicate the first unlock request to the first centralized access control circuit 106a for unlocking the first set of bytes. Unlocking the first set of bytes entails executing the unlock operation on the first and second lock bits $L_1$ and $L_2$ to update the value of each of the first and second lock bits $L_1$ and $L_2$ from "1" to "0". Process of executing the unlock operation may be similar to a process of locking the first set of bytes based on the first lock request as explained in the foregoing. If the second processor core 102b is granted the third level of access privilege and the value of each lock bit of the first and second lock bits $L_1$ and $L_2$ is updated from "1" to "0", the second processor core 102b may again communicate the second access request for writing to the first set of bytes.

Figure 3:
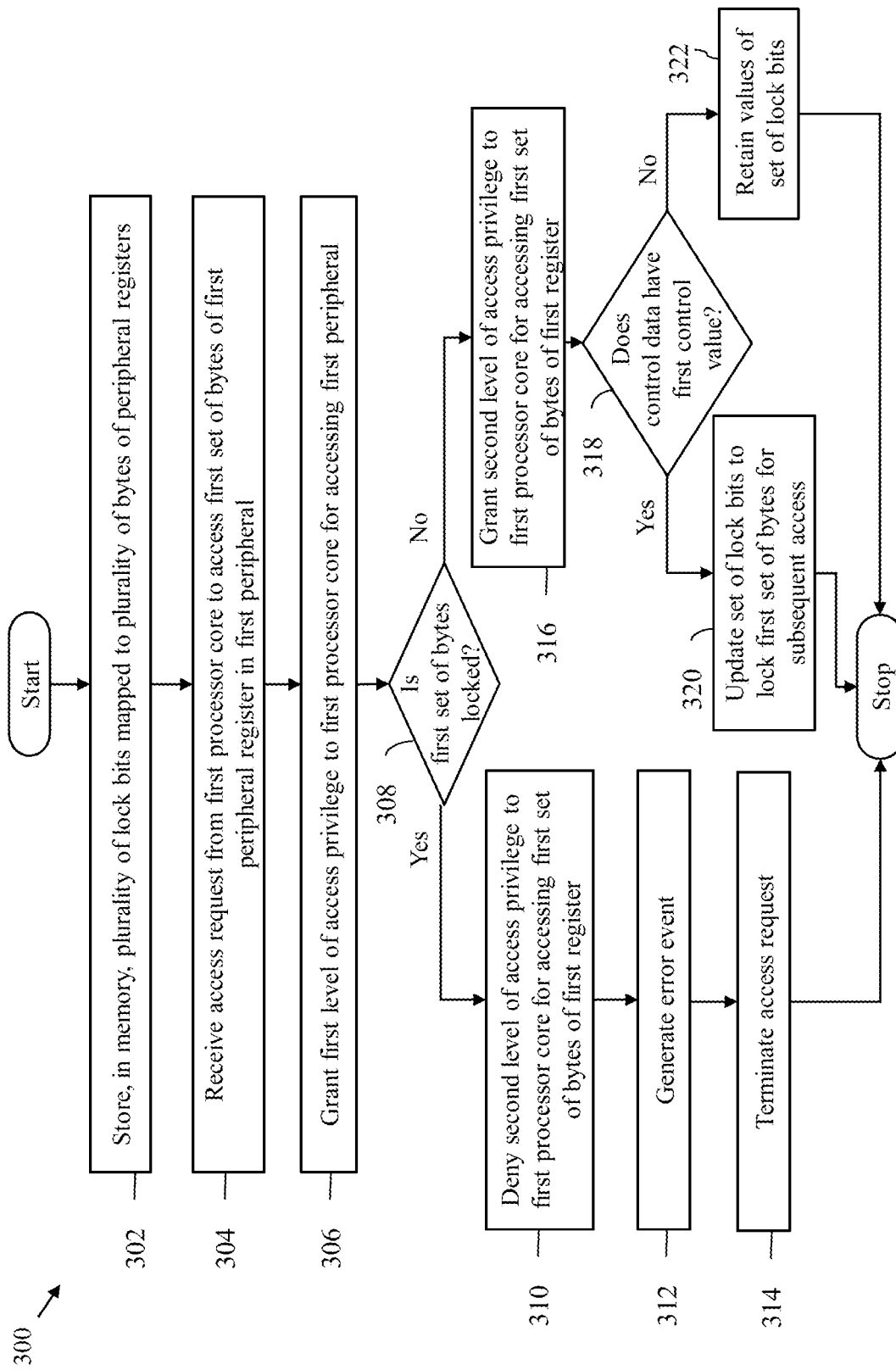
FIG. 3 represents a flowchart that illustrates the centralized access control circuit controlling access privileges of a processor core of the SoC for accessing a peripheral of the SoC in accordance with an embodiment of the present disclosure.

FIG. 3 represents a flowchart 300 that illustrates a method for controlling the first and second access privileges of a processor core for accessing one or more bytes of a peripheral register of a peripheral, in accordance with an embodiment of the present disclosure. FIG. 3 is described in conjunction with FIG. 2. For the sake of brevity, the flowchart 300 is described for controlling the first and second access privileges of the first processor core 102a for accessing the first set of bytes (i.e., the bytes B1 and B2) of the first peripheral register 112a of the first peripheral 108a.

At step 302, the memory controller 206 stores, in the memory 202, the plurality of lock bits 214 mapped to a plurality of bytes. The plurality of bytes include various bytes corresponding to each peripheral register included in the plurality of peripherals 108a-108n. At step 304, the first sub-circuit 204 receives the first access request from the first processor core 102a. The first access request includes the first identifier of the first processor core 102a, the first address of the bytes $B_1$ and $B_2$ (i.e., the first set of bytes) of the first peripheral register 112a, the first data to be written to the first set of bytes, and the first control data. At step 306, the first sub-circuit 204 grants the first level of access privilege to the first processor core 102a for accessing the first set of bytes (as described in the foregoing description of FIG. 2). The first sub-circuit 204 provides the first access request to the memory controller 206 via the comparator 210.

At step 308, the memory controller 206 determines whether the first set of bytes (i.e., the bytes $B_1$ and $B_2$ of the first peripheral register 112a) is locked based on a value of each of the first and second lock bits $L_1$ and $L_2$. In other words, the memory controller 206 determines whether the value of each lock bit of the first and second lock bits $L_1$ and $L_2$ is equal to "0" or "1". If at step 308, the memory controller 206 determines that the first set of bytes is locked, step 310 is performed. At step 310, the memory controller 206 denies the second level of access privilege to the first processor core 102a for accessing the first set of bytes. At step 312, the memory controller 206 generates an error event based on the denial of the second level of access privilege to the second processor core 102b. The memory controller 206 communicates, to the first sub-circuit 204, a message indicative of the generated error event. At step 314, the first sub-circuit 204 terminates the first access request and communicates the message to the first processor core 102a by way of the set of communication buses 104.

If at step 308, the memory controller 206 determines that the first set of bytes is not locked, step 316 is performed. At step 316, the memory controller 206 grants the second level of access privilege to the first processor core 102a for accessing the first set of bytes (as described in the foregoing description of FIG. 2). At step 318, the memory controller 206 determines whether the first control data has the first control value. In other words, the memory controller 206 determines whether the first instruction, indicating that the first control data has the first control value, is received from the comparator 210 or the second instruction indicating that the first control data has the second control value.

If at step 318, the memory controller 206 determines that the first control data has the first control value, step 320 is performed. At step 320, the memory controller 206 updates or modifies the value of each of the first and second lock bits $L_1$ and $L_2$ to "1" to lock the first set of bytes for subsequent access (i.e., subsequent write operations). Consequently, the memory controller 206 communicates, to the first sub-circuit 204, a message indicative of the granting of the second level of access to the first processor core 102a. The first sub-circuit 204, communicates the first access request to the first peripheral 108a, where the first data is written to the first set of bytes, based on the first access request.

If at step 318, the memory controller 206 determines that the first control data does not have the first control value (i.e., the first control data has the second control value), step 322 is performed. At step 322, the memory controller 206 retains the value of each of the first and second lock bits $L_1$ and $L_2$. In other words, the value of each of the first and second lock bits $L_1$ and $L_2$ is not updated to "1", and the first set of bytes is not locked for subsequent access requests (i.e., subsequent write operations). Consequently, the memory controller 206 communicates, to the first sub-circuit 204, a message indicative of the granting of the second level of access to the first processor core 102a. The first sub-circuit 204, communicates the first access request to the first peripheral 108a, where the first data is written to the first set of bytes, based on the first access request.

Figure 4:
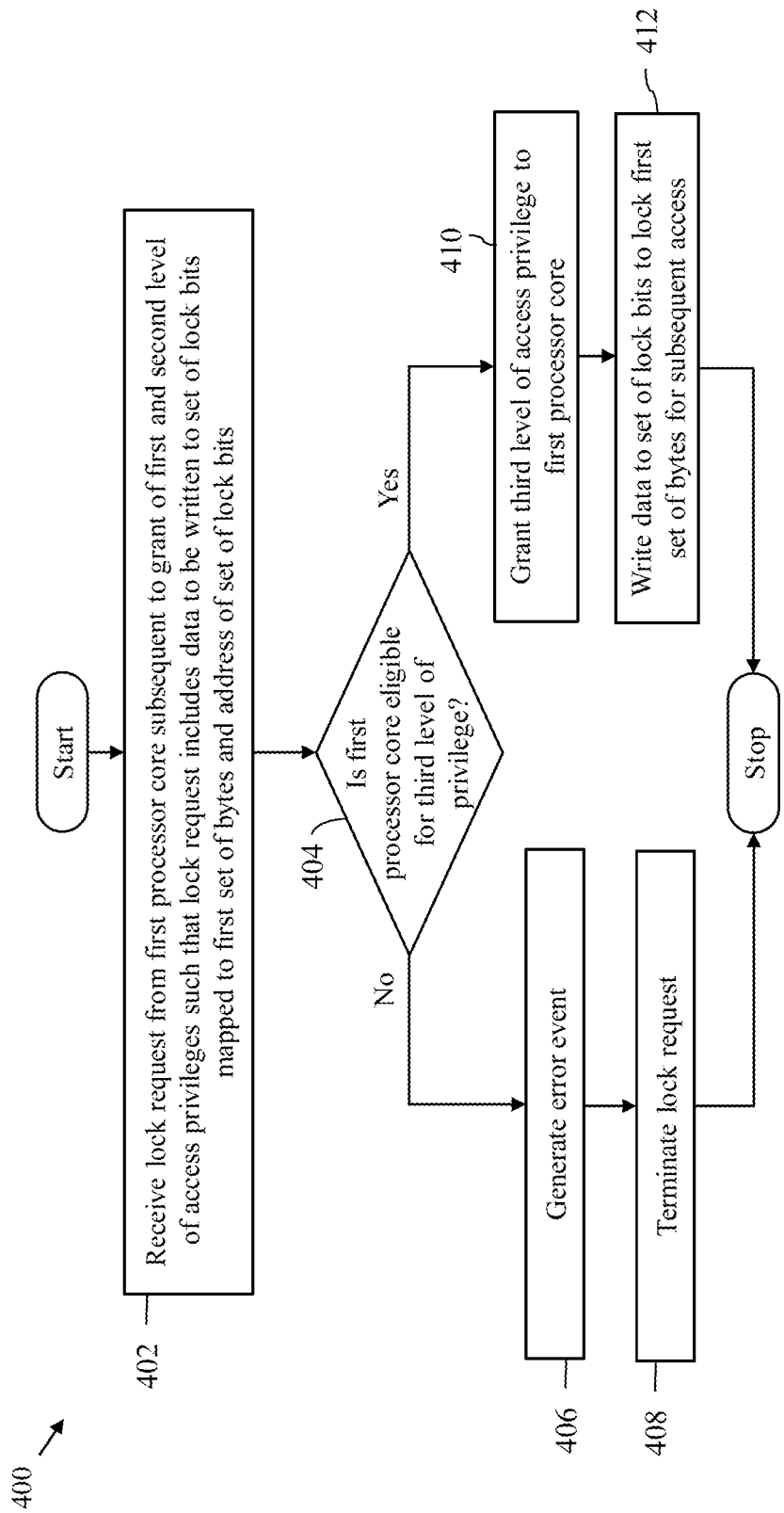
FIG. 4 represents a flowchart that illustrates locking a set of bytes of a peripheral register of the peripheral in accordance with an embodiment of the present disclosure.

FIG. 4 represents a flowchart 400 that illustrates a method for locking the first set of bytes of the first peripheral register 112a based on the first lock request in accordance with an embodiment of the present disclosure. At step 402, the memory controller 206 receives the first lock request generated by the first processor core 102a. In a non-limiting example, the first lock request is received subsequent to the granting of the first and second level of access privileges to the first processor core 102a for accessing the first set of bytes of the first peripheral register 112a. The first lock request includes the second address of the first and second lock bits $L_1$ and $L_2$, the first identifier, and the third data to be written to the first and second lock bits $L_1$ and $L_2$. At step 404, the memory controller 206 determines, based on the second set of rules 220, whether the first processor core 102a is eligible for the third level of access privilege for updating the value of each of the first and second lock bits $L_1$ and $L_2$.

If at step 404, the memory controller 206 determines that the first processor core 102a is not eligible for the third level of access privilege, step 406 is performed. At step 406, the memory controller 206 denies the third level of access privilege to the first processor core 102a and generates an error event indicative of the denial. At step 408, the memory controller 206 terminates the first lock request. The memory controller 206 communicates a message indicative of the generated error event to the first processor core 102a by way of the set of communication buses 104.

If at step 404, the memory controller 206 determines that the first processor core 102a is eligible for the third level of access privilege, step 410 is performed. At step 410, the memory controller 206 grants the third level of access privilege to the first processor core 102a. At step 412, the memory controller 206 writes the third data to the first and second lock bits $L_1$ and $L_2$, thereby locking the first set of bytes (i.e., the bytes $B_1$ and $B_2$) of the first peripheral register 112a for subsequent access. In other words, the memory controller 206 executes the lock operation on the first and second lock bits $L_1$ and $L_2$.

Thus, the set of centralized access control circuits 106 provides security for the plurality of peripherals 108a-108n and the $(n+1)^{th}$ peripheral 110 and corresponding peripheral registers. The set of centralized access control circuits 106 integrates peripheral level protection and register level protection (having byte level granularity) for each peripheral and peripheral register on the SoC 100 within a single hardware circuit, thereby reducing an area of the SoC 100. reduction in the area of the SoC 100 results in various benefits such as, but not limited to, lower cost of fabrication, lower power consumption, and decreased latency for communication between components of the SoC 100. Further, the plurality of lock bits 214 are stored within a single memory (i.e., the memory 202), avoiding a need to add individual flip-flops. The plurality of lock bits 214 allow for implementation of security or protection at varying levels of granularity. For example, the first through eighth bytes $B_1$-$B_8$ (i.e., word level protection granularity) of the first peripheral register 112a or the entire first peripheral register 112a may be locked or protected. In another example, the first through fourth bytes $B_1$-$B_4$ (i.e., half-word level protection granularity) of the first peripheral register 112a may be locked or protected, while the remaining fifth through eighth bytes $B_5$-$B_8$ may be left unlocked or unprotected. In another example, only the first byte $B_1$ (i.e., byte level protection granularity) of the first peripheral register 112a may be locked, while the remaining second through eighth bytes $B_2$-$B_8$ may be left unlocked. Furthermore, provisioning of protection for each peripheral and software configurability of the provisioned protection enables the SoC 100 to meet varied protection requirements across multiple application areas. This allows for design and fabrication of a generic or modular SoC for various applications.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims. Further, unless stated otherwise, terms such as "first" and "second" are used to arbitrarily distinguish between the elements such terms describe. Thus, these terms are not necessarily intended to indicate temporal or other prioritization of such elements.

What is claimed is:

1. A centralized access control circuit to control access privileges of a set of processor cores for accessing at least one peripheral, wherein the peripheral includes at least one peripheral register, the centralized access control circuit comprising:
    a memory that includes a plurality of lock bits mapped to a plurality of bytes of the peripheral register, respectively;
    a first sub-circuit that is configured to:
        receive, from a first processor core of the set of processor cores, a first access request to access a set of bytes of the plurality of bytes, wherein the first access request includes a first identifier of the first processor core and a first address of the set of bytes; and
        grant, based on the first identifier and the first address, a first level of access privilege to the first processor core for accessing the peripheral; and
    a memory controller that is coupled to the memory and the first sub-circuit, and configured to:
        receive the first access request; and
        grant, based on a value of each of a set of lock bits mapped to the set of bytes, a second level of access privilege to the first processor core for accessing the set of bytes, wherein the plurality of lock bits include the set of lock bits, and wherein the set of bytes is accessed by the first processor core based on the first and second levels of access privileges;
    a second sub-circuit that is coupled to the memory controller, and configured to store a plurality of initial values of the plurality of lock bits, respectively, wherein the memory controller is further configured to initialize the plurality of lock bits based on the plurality of initial values upon reset of the centralized access control circuit.

2. The centralized access control circuit of claim 1, wherein the first sub-circuit is further configured to store a set of rules associated with the first level of access privilege, and wherein the first sub-circuit grants the first level of access privilege to the first processor core further based on the set of rules.

3. The centralized access control circuit of claim 1, wherein a value of each of the plurality of lock bits indicates a lock status of each corresponding byte of the plurality of bytes of the peripheral register.

4. A centralized access control circuit to control access privileges of a set of processor cores for accessing at least one peripheral, wherein the peripheral includes at least one peripheral register, the centralized access control circuit comprising:
    a memory that includes a plurality of lock bits mapped to a plurality of bytes of the peripheral register, respectively;
    a first sub-circuit that is configured to:
        receive, from a first processor core of the set of processor cores, a first access request to access a set of bytes of the plurality of bytes, wherein the first access request includes a first identifier of the first processor core and a first address of the set of bytes; and
        grant, based on the first identifier and the first address, a first level of access privilege to the first processor core for accessing the peripheral; and
    a memory controller that is coupled to the memory and the first sub-circuit, and configured to:
        receive the first access request; and
        grant, based on a value of each of a set of lock bits mapped to the set of bytes, a second level of access privilege to the first processor core for accessing the set of bytes, wherein the plurality of lock bits include the set of lock bits, and wherein the set of bytes is accessed by the first processor core based on the first and second levels of access privileges;
    wherein the first access request corresponds to a write operation to be performed by the first processor core on the set of bytes of the peripheral register, and wherein the first access request further includes control data to control simultaneous execution of the write operation on the set of bytes by the first processor core and a lock operation on the set of lock bits.

5. The centralized access control circuit of claim 4, further comprising a second sub-circuit that is coupled to the memory controller, and configured to store a plurality of initial values of the plurality of lock bits, respectively, wherein the memory controller is further configured to initialize the plurality of lock bits based on the plurality of initial values upon reset of the centralized access control circuit.

6. The centralized access control circuit of claim 4, wherein when the control data has a first control value, the memory controller is further configured to execute the lock operation on the set of lock bits in parallel to execution of the write operation on the set of bytes by the first processor core, and wherein in the lock operation, the value of each of the set of lock bits is updated to lock the set of bytes of the peripheral register for a subsequent write operation.

7. The centralized access control circuit of claim 6, wherein:
    the first sub-circuit is further configured to:
        receive, from a second processor core of the set of processor cores, a second access request to access the set of bytes, wherein the second access request includes a second identifier of the second processor core and the first address of the set of bytes; and
        grant, based on the second identifier and the first address, the first level of access privilege to the second processor core for accessing the peripheral; and the memory controller is further configured to:
  deny, based on the updated value of each of the set of lock bits, the second level of access privilege to the second processor core for accessing the set of bytes; and
  generate an error event to indicate that the second level of access privilege is denied to the second processor core, wherein the first sub-circuit is further configured to terminate the second access request based on the error event.

8. The centralized access control circuit of claim 4, wherein when the control data has a second control value, the memory controller is further configured to:
  receive a lock request from the first processor core to execute the lock operation on the set of lock bits subsequent to execution of the write operation, wherein the lock request includes a second address of the set of lock bits and first data that is to be written to the set of lock bits; and
  execute the lock operation on the set of lock bits based on the lock request, wherein in the lock operation, the first data is written to the set of lock bits to update the value of each of the set of lock bits.

9. The centralized access control circuit of claim 8, further comprising:
  a comparator that is coupled to the memory controller, and configured to receive the first access request, and provide the first access request and one of a first instruction and a second instruction to the memory controller based on the control data included in the first access request, wherein the simultaneous execution of the write operation on the set of bytes by the first processor core and the lock operation on the set of lock bits is controlled based on one of the first instruction and the second instruction; and
  a first register that is coupled to the memory controller, and configured to receive and store therein the lock request, and provide the lock request to the memory controller.

10. The centralized access control circuit of claim 8, wherein the memory controller is further configured to:
  determine, based on the received lock request, an eligibility of the first processor core for a third level of access privilege; and
  grant a third level of access privilege to the first processor core based on the determined eligibility, and wherein the lock operation is executed on the set of lock bits based on the third level of access privilege granted to the first processor core.

11. A system-on-chip (SoC), comprising:
  a set of processor cores including a first processor core;
  at least one peripheral comprising at least one peripheral register, wherein the peripheral register includes a plurality of bytes; and
  a centralized access control circuit that is coupled to the set of processor cores and the peripheral to control access privileges of the set of processor cores for accessing the peripheral, the centralized access control circuit comprising:
    a memory that includes a plurality of lock bits mapped to the plurality of bytes, respectively;
    a first sub-circuit that is configured to:
      receive, from the first processor core, a first access request to access a set of bytes of the plurality of bytes, wherein the first access request includes a first identifier of the first processor core and a first address of the set of bytes; and
      grant, based on the first identifier and the first address, a first level of access privilege to the first processor core, for accessing the peripheral; and
    a memory controller that is coupled to the memory and the first sub-circuit, and configured to:
      receive the first access request; and
      grant, based on a value of each of a set of lock bits mapped to the set of bytes, a second level of access privilege to the first processor core for accessing the set of bytes, wherein the plurality of lock bits include the set of lock bits, and wherein the set of bytes is accessed by the first processor core based on the first and second levels of access privileges;
  wherein the centralized access control circuit further comprises a second sub-circuit that is coupled to the memory controller, and configured to store a plurality of initial values of the plurality of lock bits, respectively, and wherein the memory controller is further configured to initialize the plurality of lock bits based on the plurality of initial values upon reset of the SoC.

12. The SoC of claim 11, wherein a value of each of the plurality of lock bits indicates a lock status of each corresponding byte of the plurality of bytes of the peripheral register.

13. A system-on-chip (SoC), comprising:
  a set of processor cores including a first processor core;
  at least one peripheral comprising at least one peripheral register, wherein the peripheral register includes a plurality of bytes; and
  a centralized access control circuit that is coupled to the set of processor cores and the peripheral to control access privileges of the set of processor cores for accessing the peripheral, the centralized access control circuit comprising:
    a memory that includes a plurality of lock bits mapped to the plurality of bytes, respectively;
    a first sub-circuit that is configured to:
      receive, from the first processor core, a first access request to access a set of bytes of the plurality of bytes, wherein the first access request includes a first identifier of the first processor core and a first address of the set of bytes; and
      grant, based on the first identifier and the first address, a first level of access privilege to the first processor core, for accessing the peripheral; and
    a memory controller that is coupled to the memory and the first sub-circuit, and configured to:
      receive the first access request; and
      grant, based on a value of each of a set of lock bits mapped to the set of bytes, a second level of access privilege to the first processor core for accessing the set of bytes, wherein the plurality of lock bits include the set of lock bits, and wherein the set of bytes is accessed by the first processor core based on the first and second levels of access privileges;
  wherein the first access request corresponds to a write operation to be performed by the first processor core on the set of bytes of the peripheral register, and wherein the first access request further includes control data to control simultaneous execution of the write operation on the set of bytes by the first processor core and a lock operation on the set of lock bits.

14. The SoC of claim 13, wherein the centralized access control circuit further comprises a second sub-circuit that is coupled to the memory controller, and configured to store a plurality of initial values of the plurality of lock bits, respectively, and wherein the memory controller is further configured to initialize the plurality of lock bits based on the plurality of initial values upon reset of the SoC.

15. The SoC of claim 13, wherein when the control data has a first control value, the memory controller is further configured to execute the lock operation on the set of lock bits in parallel to execution of the write operation on the set of bytes by the first processor core, and wherein in the lock operation, the value of each of the set of lock bits is updated to lock the set of bytes for a subsequent write operation.

16. The SoC of claim 15, wherein:
the first sub-circuit is further configured to:
  receive, from a second processor core of the set of processor cores, a second access request to access the set of bytes, wherein the second access request includes a second identifier of the second processor core and the first address of the set of bytes; and
  grant, based on the second identifier and the first address, the first level of access privilege to the second processor core for accessing the peripheral; and
the memory controller is further configured to:
  deny, based on the updated value of each of the set of lock bits, the second level of access privilege to the second processor core for accessing the set of bytes; and
  generate an error event to indicate that the second level of access privilege is denied to the second processor core, wherein the first sub-circuit is further configured to terminate the second access request based on the error event.

17. The SoC of claim 13, wherein when the control data has a second control value, the memory controller is further configured to:
  receive a lock request from the first processor core to execute the lock operation on the set of lock bits subsequent to execution of the write operation, wherein the lock request includes a second address of the set of lock bits and first data that is to be written to the set of lock bits;
  determine, based on the received lock request, an eligibility of the first processor for a third level of access privilege;
  grant a third level of access privilege to the first processor core based on the determined eligibility; and
  execute the lock operation on the set of lock bits based on the third level of access privilege granted to the first processor, wherein in the lock operation, the first data is written to the set of lock bits to update the value of each of the set of lock bits.

18. The SoC of claim 17, wherein the centralized access control circuit further comprises:
  a comparator that is coupled to the memory controller, and configured to receive the first access request, and provide the first access request and one of a first instruction and a second instruction to the memory controller based on the control data included in the first access request, wherein the simultaneous execution of the write operation on the set of bytes by the first processor core and the lock operation on the set of lock bits is controlled based on one of the first instruction and the second instruction; and
  a first register that is coupled to the memory controller, and configured to receive and store therein the lock request, and provide the lock request to the memory controller.

19. A method for controlling access privileges of a processor core for accessing at least one peripheral, wherein the peripheral includes at least one peripheral register having a plurality of bytes, the method comprising:
  storing, by a centralized access control circuit, a plurality of lock bits mapped to the plurality of bytes, respectively;
  receiving, by the centralized access control circuit from the processor core, an access request to access a set of bytes of the plurality of bytes, wherein the access request includes an identifier of the processor core and an address of the set of bytes;
  granting, by the centralized access control circuit, based on the identifier and the address, a first level of access privilege to the processor core for accessing the peripheral; and
  granting, by the centralized access control circuit, based on a set of lock bits mapped to the set of bytes, a second level of access privilege to the processor core for accessing the set of bytes, wherein the plurality of lock bits include the set of lock bits, and wherein the set of bytes is accessed by the processor core based on the first and second levels of access privileges;
  executing, by the centralized access control circuit based on control data included in the access request, a lock operation in parallel to execution of a write operation on the set of bytes by the processor core, wherein in the lock operation, the set of lock bits is updated to lock the set of bytes for subsequent access.

* * * * *